United States Patent
Miersch

(10) Patent No.: US 6,526,207 B2
(45) Date of Patent: Feb. 25, 2003

(54) CABLE ASSEMBLY AND METHOD OF MAKING THE SAME

(75) Inventor: Erik Miersch, Wiesenbroun (DE)

(73) Assignee: Leoni Bordnetz -Systeme GmbH & Co. KG (DE)

( * ) Notice: Subject to any disclaimer, the term of this patent is extended or adjusted under 35 U.S.C. 154(b) by 161 days.

(21) Appl. No.: 09/728,062

(22) Filed: Dec. 4, 2000

(65) Prior Publication Data

US 2002/0160132 A1 Oct. 31, 2002

(30) Foreign Application Priority Data

Dec. 3, 1999 (DE) .......................................... 199 58 431

(51) Int. Cl.⁷ ............................... G02B 6/16; G02B 6/44
(52) U.S. Cl. ...................... 385/100; 174/74 A; 385/101
(58) Field of Search ................................. 385/100–101; 174/74 A

(56) References Cited

U.S. PATENT DOCUMENTS

| | | | | |
|---|---|---|---|---|
| 4,555,054 A | * | 11/1985 | Winter et al. | 228/148 |
| 5,136,680 A | * | 8/1992 | Seike et al. | 385/139 |
| 5,617,497 A | * | 4/1997 | Kingstone | 385/100 |
| 5,970,196 A | * | 10/1999 | Greveling et al. | 385/114 |

FOREIGN PATENT DOCUMENTS

| | | |
|---|---|---|
| DE | 37 42 731 | 6/1989 |
| GB | 2 181 605 | 4/1987 |

* cited by examiner

Primary Examiner—Lynn D. Feild
Assistant Examiner—Michael C. Zarroli
(74) Attorney, Agent, or Firm—Venable; Robert Kinberg

(57) ABSTRACT

A cable assembly includes a sleeve body of plastic material; a protective tube extending in the sleeve body; a cable element disposed within the protective tube; and a transverse port provided in the wall of the protective tube. The plastic material extends through the transverse port into the protective tube and cross-sectionally seals the protective tube water tight in a region of the transverse port.

15 Claims, 2 Drawing Sheets

CABLE ASSEMBLY AND METHOD OF MAKING THE SAME

CROSS-REFERENCE TO RELATED APPLICATION

This application claims the priority of German Patent Application Serial No. 199 58 431.1, filed on Dec. 3, 1999, the subject matter of which is incorporated herein by reference.

BACKGROUND OF THE INVENTION

The present invention relates to a cable assembly and a method of making the same.

For the production of cable assemblies or cable harnesses, a plurality of elongated cable elements, such as electrical and optical strands, are normally laid out along a desired path and plastic material is then foamed, poured or sprayed around them. Following the cooling and hardening of the plastic material, the cable elements are combined as bundles following a predetermined path inside a hardened plastic sleeve body and are secured in this way. During the manufacture of the sleeve body or the outer sleeve shell the thermally sensitive cable elements, such as optical wave guides, can be damaged by the hot plastic material and excessively high temperatures. Furthermore, the bundling and/or predetermined specific layout of the respective cable element involves the danger that mechanically sensitive cable elements are subjected to an excessively high lateral pressure or are excessively bent or kinked, thus subjecting them to an impermissibly high mechanical stress.

A design using a molded plug to render a cable assembly longitudinally watertight is disclosed in German Offenlegungsschrift (application published without examination) No. 37 42 731, while a method of guiding conductors through a cable assembly within a protective tube is known from published British Application No. 21 81 605.

SUMMARY OF THE INVENTION

It is an object of the invention to provide an improved arrangement for producing cable assemblies easily and in a more reliable manner.

This object is achieved according to the invention with a cable assembly of the aforementioned type in that the cable assembly comprises at least one protective tube which accommodates at least one cable element to protect it against thermal and/or mechanical stresses. The protective tube is furthermore provided with at least one transverse port on the inside tube wall. Plastic material used for the sleeve body flows during manufacture through the transverse port from the outside to the inside, such that the protective tube is filled watertight in the longitudinal direction in the region where the material flows in.

By providing at least one protective tube inside the plastic material of the sleeve body for the mechanically and/or thermally sensitive cable elements, such as optical wave guides, it is ensured that such sensitive cable elements are protected against excess thermal and/or mechanical stresses. The protective tube therefore provides a thermal barrier or screen for the cable elements it surrounds during the production of the sleeve body by virtue of pouring on or foaming on the plastic material. Thus, the cable element inside the protective tube is not directly subjected to the hot plastic material used for producing the sleeve body. The protective tube at the same time represents a mechanically reinforced passage inside the plastic material of the sleeve body, which provides additional mechanical protection for the cable assembly against bending stresses. Furthermore, if two groups of different thermally and/or mechanically sensitive cable elements are to be combined by a cable assembly, the protective tube makes it possible to accommodate the more sensitive cable elements inside the protective tube and thus separate them from the thermally and/or mechanically less sensitive cable elements. In addition, the protective tube ensures to a high degree that lateral pressure forces, that may be due to the bundling of several cable elements or the clamping of the beginning and the end of the bundle to direct the cable elements onto a desired path, can substantially be kept away from the cable elements inside the protective tube.

Liquid plastic material can penetrate into the protective tube during the production of the sleeve body since at least one transverse port is provided in the wall of at least one longitudinal section of the protective tube. The protective tube is therefore cross-sectionally filled so as to be substantially watertight in the longitudinal direction in the region of the transverse port. The protective tube is thus longitudinally sealed at the same time as the sleeve body is produced and as part of the same step. Thus, no additional operation is needed for providing a longitudinal watertight seal for the protective tube.

A further feature of the invention provides that the transverse port inside the protective tube is advantageously dimensioned such that the protective tube is filled with the inflowing plastic material so as to render it watertight, but only over a partial tube length. Thus, first, there is effected a targeted metering of the plastic material into the protective tube, so that the amount of the inflowing plastic material is sufficient to ensure a tight longitudinal sealing of the protective tube. Second, the flow of hot plastic material is simultaneously regulated to allow only enough plastic material to enter the protective tube to ensure that an excess thermal stressing of the sensitive cable elements inserted therein is substantially avoided. The protective tube therefore is not filled along the entire tube length with the plastic material, but only locally, along a partial section of its total length.

DETAILED DESCRIPTION OF THE PREFERRED EMBODIMENTS

Figure 1:
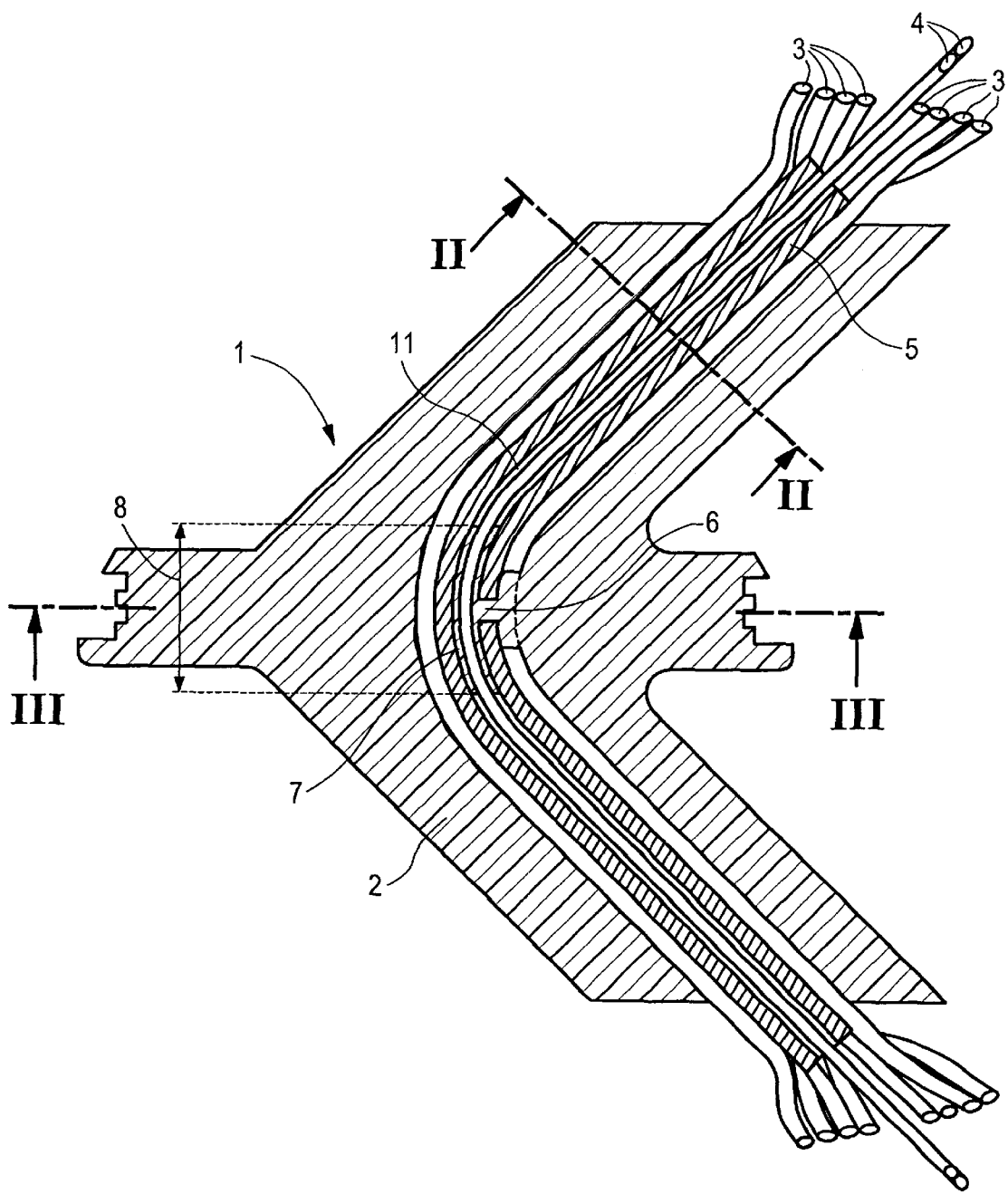
FIG. 1 is a schematic longitudinal sectional view of a preferred embodiment of a finished cable assembly according to the invention.

FIG. 1 shows a schematic longitudinal section of a cable assembly 1 in the finished state. The cable assembly 1 comprises an outer shell or sleeve body 2 of, for example, foamed-on plastic material. In the hardened state the plastic material of the sleeve body 2 forms an essentially rigid, dimensionally stable component having a plurality of elongated cable elements embedded therein. The cable elements are combined into bundles inside the plastic material of the sleeve body 2 and are secured in their position along a predetermined path. The cable elements extend essentially parallel next to each other and are caused by the sleeve body 2 to assume, for example, an approximately parabolic path.

In the cable assembly 1 a first group of elongated cable elements is formed, composed of conventional electrical conductors 3 or strands.

A protective tube 5 is arranged approximately in the center of the bundle of electrical conductors 3. The protective tube 5 contains, for example, two optical wave guides 4 which form a second group of cable elements; they are thermally and/or mechanically more sensitive than the first group of cable elements arranged about the protective tube 5. The protective tube 5 protects the sensitive optical wave guides 4 against thermal and/or mechanical stresses, for example bending or pressure stresses. Thus, as the plastic material of the sleeve body 2 is applied by spraying, pouring or foaming, the protective tube 5 forms a thermal barrier or screen for the thermally sensitive optical wave guides 4 located in the protective tube 5. During the production of the sleeve body 2, the optical wave guides 4 are thus not subjected over their entire length directly to the hot, liquefied material or, in the case of a two-component system, to the heated material. In contrast, the electrical conductors 3 that are arranged around the protective tube 5 are embedded directly into the plastic material of the sleeve body 2.

The approximately central arrangement of the protective tube 5 inside the bundle of electrical conductors 3 also serves as an additional thermal screen for the optical wave guides 4 inside the protective tube 5. Owing to an arrangement of electrical conductors 3 in layers around the outside circumference of the protective tube 5, the temperature effect of the hot plastic material on the cable element/optical wave guide is additionally reduced during the production of the sleeve body 2. A double thermal barrier therefore screens the optical wave guides 4 against the hot plastic material of the sleeve body 2 inside the protective tube 5: On the one hand, the wave guides 4 are protected by the walls of the protective tube 5 while, on the other hand, they are protected by the electrical conductors 3, which are distributed in at least one layer around the outside circumference of the protective tube 5.

In addition to or independently from its the thermal blocking function, the protective tube 5 is advantageously designed to form a mechanically reinforced passage inside the plastic material of sleeve body 2. In this way, an additional mechanical protection is provided for the optical wave guides 4 in case of bending or pressure stresses. The protective tube 5 is expediently designed to be resistant to lateral pressures, whereby impermissibly high lateral pressure forces are substantially prevented from affecting the mechanically sensitive optical wave guides 4. Such lateral pressure forces can occur even by the bundling of the cable elements. Also critical is the clamping or securing of the beginning and the end of the bundle in order to place the cable elements into a predetermined curved path for the sleeve production. Here too, the protective tube 5 substantially ensures that the mechanically sensitive optical wave guides 4 are not exposed to impermissibly high lateral pressure forces. Polyamide, polypropylene or polyethylene may be considered as suitable materials for the protective tube 5.

In summary, two groups of different, thermally and/or mechanically sensitive cable elements are thus combined inside the cable assembly 1. The thermally and/or mechanically more sensitive cable elements, such as the two optical wave guides 4, are housed inside an additional protective tube 5 and are thus separated from the thermally and/or mechanically less sensitive cable elements, such as the electrical conductors 3.

It is to be understood that, if desirable, more than one protective tube can arranged inside the plastic body 2 of the cable assembly 1. Further, the protective tube 5 can also accommodate sensitive electrical or optical transmission elements besides the cable elements 4.

The protective tube 5 is provided with a transverse port 6 at least at one tube wall location to allow a sealing of the inside of the protective tube 5, to thus prevent moisture, such as diffused water vapor or any other liquid that has entered, from spreading along its axial length. In the protective tube 5 such a transverse port is formed by an aperture in the tube wall, approximately in the center of the longitudinal extension of the cable assembly 1. The aperture is located approximately in the apex of the approximately parabolic protective tube 5. The transverse port 6 extends transversely or laterally, in particular perpendicularly to the axial longitudinal extension of protective tube 5. When producing the sleeve body 2, for example by spraying or foaming the hot, viscous plastic material around the bundle of cable elements, the transverse port 6 ensures that during the same manufacturing step the plastic material simultaneously flows into the protective tube 5. In the finished state of the cable assembly, the protective tube 5 is thus filled in the flow-in region with the plastic sealing mass 7 of the sleeve body 2 to render the protective tube 5 longitudinally watertight. In this way, the protective tube 5 is longitudinally sealed at the same time and during the same operating step the sleeve shell is manufactured. Therefore, a separate step is not required for such an operation.

The transverse port 6 advantageously should be dimensioned such that the protective tube 5 is filled substantially watertight with the entering plastic material during the production of the sleeve body 2 only partially along the axial tube length. Thus, a targeted, measured filling of the protective tube 5 with the plastic material advantageously occurs in such a way that the amount of the inflowing plastic material is sufficient to provide a proper sealing of the protective tube 5 in the form of sealing mass 7. However, the flow of hot plastic material is simultaneously regulated such that an excessive thermal stress on the optical wave guides 4 within the protective tube 5 is essentially avoided. The two optical wave guides 4 are embedded into the sealing mass 7 and are thus also fixed in their position to a certain degree along the axial length of the protective tube 5. In this way, the sealing mass 7 seals the inner space of the protective tube 5 in the axial direction against the spread of moisture, water vapor or other liquids, but only along a portion 8 of the total length of the protective tube 5. In the process, the sealing mass 7 practically completely fills the inner cross section of the protective tube 5. Since the plastic material cools down quickly when entering the transverse port 6, not least because of its small mass, and since it only spreads to a small axial length portion of the protective tube 5, an excessive thermal stress on the optical wave guides 4 is avoided.

Figure 2:
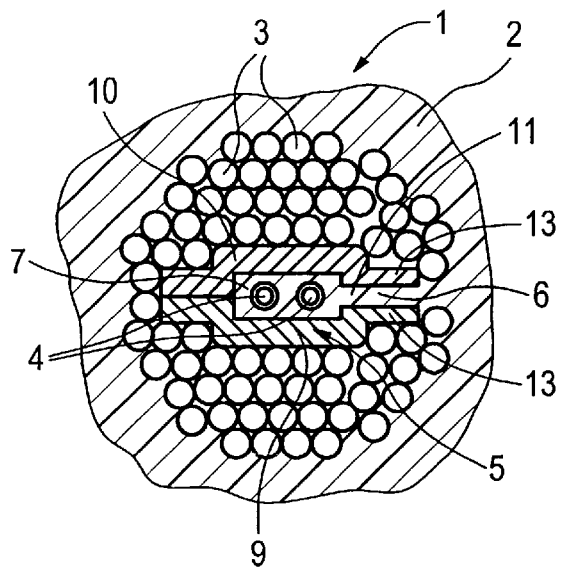
FIG. 2 is a sectional view taken along line II—II of FIG. 1.

FIG. 2 shows the section II—II of FIG. 1, at a location remote from the transverse port 6 of the protective tube 5. The protective tube 5, as may be observed in FIG. 2, is composed of two halves 9, 10, each forming a half shell having an approximately U-shaped profile. The two halves 9, 10 are fitted together in such a way that a completely closed chamber 11 is obtained. As a result of the two-part design, it is possible to open up the protective tube 5 for inserting the optical wave guides 4 during the manufacture of the cable assembly 1. Therefore, the optical wave guides 4, with connecting elements already mounted on the ends, can be inserted easily from above into the lower half 9 of the protective tube 5. The upper half 10 is then fitted onto the lower half 9, and the optical wave guides 4 are enclosed in the rectangular chamber 11 of the protective tube 5. Expediently, the two halves 9, 10 of the protective tube 5 may be inter-locked and are preferably held together by hot glue, other adhesive means or usual mechanical securing devices.

Figure 3:
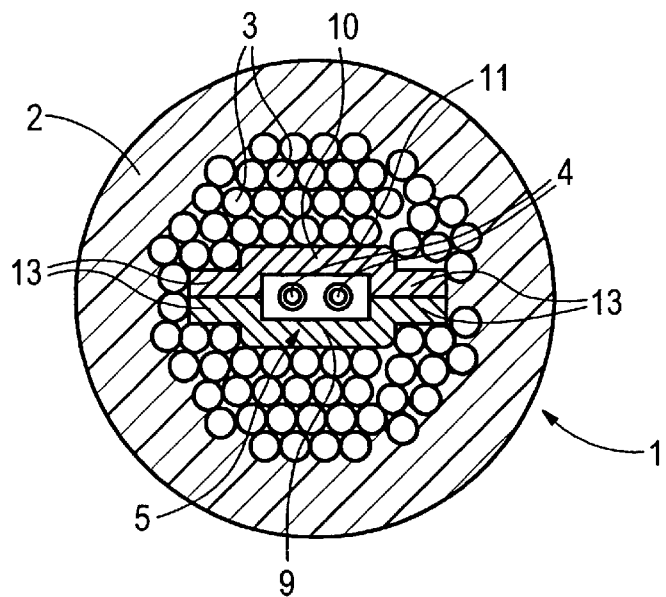
FIG. 3 is a sectional view taken along line III—III of FIG. 1.

FIG. 3 shows the section III—III of FIG. 1, at a location where the transverse port 6 of the protective tube 5 is situated. The transverse port 6 is radially dimensioned such that a substantially continuous material connection is formed between the outside region of sleeve body 2 and the plastic material 7 that has flown into the chamber 11 of protective tube 5. The side flanges 13 of the U-shaped profile halves 9, 10 of the protective tube 5 act as a deflector for the electrical conductors 3 which are arranged externally of the protective tube 5. Thus, the side flanges 13 maintain an open access from the outer sleeve body region to the inside of the protective tube 5, so that the plastic material can flow in essentially unhindered.

The electrical conductors 3 are positioned in such a way that the transverse port 6 in the protective tube 5 is freely accessible to ensure an essentially unobstructed flow of the plastic material into the protective tube 5.

Figure 4:
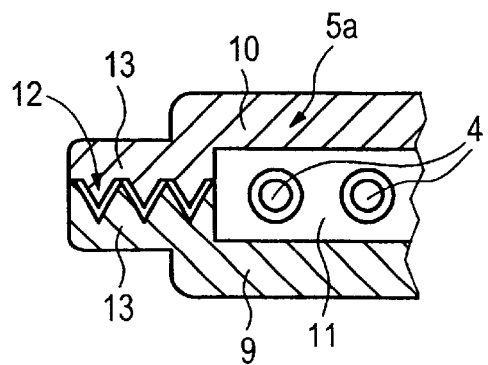
FIG. 4 is a fragmentary sectional view of a protective tube portion according to a variant as compared to the structure shown in FIGS. 1 to 3.

FIG. 4 shows a fragmentary detail of a protective tube 5a which is a variant of the protective tube 5. In contrast to the protective tube 5 shown in FIGS. 1 to 3, the surfaces of side flanges 13, which adjoin in the fully assembled state, are provided with a toothing 12 which extends in the longitudinal direction of the protective tube 5a and which provides an essentially sealed protective tube 5a when it is in its closed state. The toothing 12 is provided by a V-shaped profiling of the side edges that face each other of the two U-shaped profile parts (protective tube halves) 9, 10. The profiling is designed such that the halves 9 and 10 can be fitted together precisely, thereby permitting an easy securing of their position.

It is apparent that the protective tubes may be made as one-piece components. In such a case, to ensure a simple and efficient production of the cable assemblies, it is expedient to first provide the protective tubes with cable elements that must be protected mechanically or thermally, such as optical wave guides, and to keep such assembly ready for the production of cable assemblies. The cross-sectional shape and the manner in which the transverse port is provided are optional measures.

In the description which follows, the approximate steps for producing a cable assembly according to the invention will be set forth.

First a conductor bundle is provided which includes, for example, in its center, at least one protective tube containing one or several optical wave guides 4. The protective tube 5 that is preferably formed by two halves is initially opened up, the optical wave guides are arranged therein and the two halves are then fitted together. Expediently, the two halves are connected along one side, for example, by a live hinge, to form a one-piece component. The two halves may be attached to each other by glue, ultrasound welding or mechanical means. A cable bundle that is prepared in this way is placed into a mold such that the ends of the individual cables project from the mold. The sleeve body 2 is preferably made of polyurethane, that is, the two basic components for this material are fed via a mixing nozzle into the mold cavity where they react, for example, under generation of foam. The initially still liquid plastic material flows through the transverse port into the protective tube. The cross section of the transverse port is designed such that only a small section of the total length of the protective tube is filled in the region of penetration. Because of the very small amount of material that enters the protective tube, the thermally sensitive conductor 4 situated in the protective tube is accordingly exposed to a low thermal stress.

It will be understood that the above description of the present invention is susceptible to various modifications, changes and adaptations, and the same are intended to be comprehended within the meaning and range of equivalents of the appended claims.

What is claimed is:

1. A cable assembly comprising
   (a) a sleeve body of plastic material;
   (b) a protective tube extending in the sleeve body; said protective tube having a tube wall;
   (c) a cable element disposed within said protective tube; and
   (d) a transverse port provided in said tube wall; said plastic material extending through said transverse port into said protective tube and cross-sectionally sealing said protective tube water tight in a region of said transverse port.

2. The cable assembly as defined in claim 1, wherein said plastic material extends continuously from said sleeve body through said transverse port into said protective tube.

3. The cable assembly as defined in claim 1, wherein said transverse port is formed by a through hole provided in said protective tube.

4. The cable assembly as defined in claim 1, wherein said transverse port is dimensioned such that said plastic material cross-sectionally sealing said protective tube is present solely along a length portion of said protective tube.

5. The cable assembly as defined in claim 1, wherein said cable element is a first cable element; further comprising a plurality of second cable elements surrounding said protective tube; said second cable elements being less sensitive to one of thermal and mechanical stresses than said first cable element.

6. The cable assembly as defined in claim 5, wherein said second cable elements are electric conductors.

7. The cable assembly as defined in claim 1, wherein said cable element is an optical transmission element.

8. The cable assembly as defined in claim 1, wherein said cable element is an optical wave guide.

9. The cable assembly as defined in claim 1, wherein said protective tube has a length dimension and further wherein said protective tube is composed of two longitudinal halves extending parallel to said length dimension.

10. The cable assembly as defined in claim 9, a parting plane extending between said two longitudinal halves is oriented essentially parallel to said length dimension.

11. The cable assembly as defined in claim 9, wherein said two longitudinal halves have surfaces being in engagement with one another; said surfaces having inter-engaging teeth.

12. The cable assembly as defined in claim 1, wherein said plastic material is polyurethane.

13. A method of making a cable assembly, comprising the following steps:
   (a) providing a protective tube having a tube wall in which a transverse port extends;
   (b) placing a cable element in said protective tube;
   (c) surrounding said protective tube with a liquid plastic material;

(d) causing said liquid plastic material to flow through said transverse port into said protective tube; and (e) allowing said liquid plastic material to harden for obtaining a sleeve body about said protective tube and an essentially watertight cross-sectional seal within said protective tube in a region of said transverse port.

14. The method as defined in claim 13, further comprising the step of placing about said protective tube, prior to step (c), a plurality of cable elements being less sensitive to one of thermal and mechanical stresses than the cable element situated in said protective tube.

15. The method as defined in claim 13, wherein said plastic material is polyurethane.

* * * * *